(12) United States Patent
Xiao et al.

(10) Patent No.: US 9,506,474 B2
(45) Date of Patent: Nov. 29, 2016

(54) METHODS AND SYSTEMS FOR REAL-TIME COMPRESSOR SURGE LINE ADAPTATION

(71) Applicant: Ford Global Technologies, LLC, Dearborn, MI (US)

(72) Inventors: Baitao Xiao, Canton, MI (US); Hamid-Reza Ossareh, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/563,749

(22) Filed: Dec. 8, 2014

(65) Prior Publication Data
US 2016/0160868 A1    Jun. 9, 2016

(51) Int. Cl.
| | |
|---|---|
| *F02B 33/44* | (2006.01) |
| *F04D 27/02* | (2006.01) |
| *F01D 17/00* | (2006.01) |
| *F04D 17/10* | (2006.01) |
| *F04D 27/00* | (2006.01) |
| *F02D 35/00* | (2006.01) |

(52) U.S. Cl.
CPC ........... *F04D 27/0253* (2013.01); *F02D 35/00* (2013.01); *F04D 17/10* (2013.01); *F04D 27/001* (2013.01)

(58) Field of Classification Search
CPC ........... F04D 27/0253; F04D 27/0207; F04D 27/0246; F04D 27/0215; F04D 27/0284; F04D 27/001; F04D 17/10; F04D 9/006; F04D 41/0007; F02B 37/16; F02B 2037/125; F02B 2037/127; F02N 2037/122; F01D 17/26; F02D 9/00

USPC ................ 60/611, 605.1, 598; 415/1, 17, 27
See application file for complete search history.

(56) References Cited

U.S. PATENT DOCUMENTS

| | | | |
|---|---|---|---|
| 2,988,070 A | 6/1961 | Brueder | |
| 4,831,535 A * | 5/1989 | Blotenberg | F04D 27/0207 415/1 |
| 4,870,822 A | 10/1989 | Kamimaru | |
| 5,002,459 A * | 3/1991 | Swearingen | F04D 27/02 415/1 |
| 5,195,875 A * | 3/1993 | Gaston | F04D 27/0207 415/27 |
| 5,275,136 A | 1/1994 | Schechter et al. | |
| 5,508,943 A * | 4/1996 | Batson | F04D 27/0207 415/1 |
| 5,709,526 A * | 1/1998 | McLeister | F04D 27/0207 415/1 |
| 5,743,715 A * | 4/1998 | Staroselsky | F04D 27/02 415/1 |

(Continued)

FOREIGN PATENT DOCUMENTS

WO    WO 2014028711 A1 *    2/2014 ........... F04D 27/001

OTHER PUBLICATIONS

Watson, N. et al., "Turbocharging the Internal Combustion Engine," John Wiley & Sons, 1982, pp. 129-133, 3 pages.

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for adapting a compressor surge line in real-time. In one example, a method may include retarding a surge line in response to a number of surge events greater than a threshold number of surge events, and advancing the surge line in response to a number of aggressive tip-out events, that do not result in surge, greater than a threshold number of tip-out events.

20 Claims, 6 Drawing Sheets

(56) References Cited

U.S. PATENT DOCUMENTS

| | | | |
|---|---|---|---|
| 6,354,806 B1 | 3/2002 | Bingham, Jr. | |
| 6,990,814 B2* | 1/2006 | Boley | F02B 37/16 60/611 |
| 7,010,914 B1* | 3/2006 | Roberts, Jr. | F02B 37/16 60/611 |
| 7,578,128 B2 | 8/2009 | Miyauchi et al. | |
| 8,307,645 B2* | 11/2012 | Mischler | F02B 39/16 415/27 |
| 8,642,200 B2 | 2/2014 | Kirklin | |
| 8,661,814 B2 | 3/2014 | Ulrey et al. | |
| 2006/0283190 A1 | 12/2006 | Thomassin et al. | |
| 2008/0232952 A1* | 9/2008 | Gu | F04D 27/0215 415/1 |
| 2012/0291432 A1 | 11/2012 | Ulrey et al. | |
| 2012/0328410 A1 | 12/2012 | Narayanan et al. | |
| 2012/0328458 A1* | 12/2012 | Rauscher | F02B 37/16 415/1 |
| 2013/0309060 A1* | 11/2013 | Johnsen | F04D 27/001 415/1 |
| 2014/0219820 A1* | 8/2014 | Koki | F04D 27/001 417/19 |

OTHER PUBLICATIONS

Banker, Adam N. et al., "Methods and System for Compensating Compressor Recirculation Sludge," U.S. Appl. No. 14/566,395, filed Dec. 10, 2014, 27 pages.

Ossareh, Hamid-Reza et al., "System and Methods for CBV Diagnostics," U.S. Appl. No. 14/537,216, filed Nov. 10, 2014, 29 pages.

Banker, Adam N. et al., "Diagnostic Method for a Compressor Recirculation Valve," U.S. Appl. No. 14/565,098, filed Dec. 9, 2014, 56 pages.

Banker, Adam N. et al., "Methods and Systems for Detecting Compressor Recirculation Valve Faults," U.S. Appl. No. 14/563,841, filed Dec. 8, 2014, 51 pages.

* cited by examiner

METHODS AND SYSTEMS FOR REAL-TIME COMPRESSOR SURGE LINE ADAPTATION

FIELD

The present description relates generally to methods and systems for calibrating a surge line on a compressor map.

BACKGROUND/SUMMARY

Engine systems may be configured with boosting devices, such as turbochargers or superchargers, for providing a boosted air charge and improving peak power outputs. The use of a compressor allows a smaller displacement engine to provide as much power as a larger displacement engine, but with additional fuel economy benefits. However, when the compressor operates under low air flow and/or high pressure ratio conditions, the compressor is prone to surge. For example, when an operator tips-out of an accelerator pedal, an engine intake throttle closes, leading to reduced forward flow through the compressor, and a potential for surge. Surge can lead to noise, vibration, and harshness (NVH) issues such as undesirable noise from the engine intake system. In extreme cases, surge may result in compressor damage.

Operating points of the compressor that may lead to compressor surge are indicated on a compressor map by a surge line. For example, an engine controller may determine that the compressor is operating under surge conditions when then the compressor operating point is to the left of the surge line. Currently, engine systems utilize a calibrated surge line provided by a vehicle manufacturer in order to determine surge conditions and set control actions (in order to increase compressor flow and decrease outlet pressure by adjusting a compressor recirculation valve (CRV) coupled across the compressor, for example) for surge mitigation.

However, the inventors herein have identified potential issues with such an approach. For example, the calibrated surge line does not take into account part to part variability and aging, which may have a significant effect on the location of the surge line. Further, environmental conditions, such as temperature, may influence surge line location. Still further, the manufacturer calibrated surge line may be calibrated conservatively in order to avoid surge for a majority of application. As a result, useable compressor map region may be reduced, and consequently, drivability may be sacrificed.

In one example, some of the above issues may be at least partly addressed by a method for an engine including a compressor, comprising: detecting a surge event of the compressor based on a frequency content of a throttle inlet pressure sensor located downstream of the compressor; and adapting a surge line of a compressor map stored in a controller of the engine based on a compressor pressure ratio and a corrected compressor flow during the surge event. By adjusting the surge line based on an operating point of the compressor, surge behavior under current vehicle operating conditions including adaptations to environmental conditions may be learnt.

As an example, adaptation of the surge line on the compressor map may be learnt in real-time during one or more drive cycles based on a frequency and/or amplitude of the signal from a throttle inlet pressure sensor located downstream of the compressor. For example, the surge line may be retarded in response to detecting a surge (based on TIP sensor signal) when the compressor is operating in a non-surge region (region to the right of the surge line) of the compressor map. Further, the surge line may be advanced in response to not detecting a surge (based on TIP sensor signal) during expected surge operating conditions on the compressor map. For example, during a tip-out greater than a threshold resulting in the compressor operating in the surge region (region to the left of the surge line) of the compressor map and not detecting surge (based on TIP sensor signal), the surge line may be advanced.

In this way, based on compressor operating points and detection of surge events during vehicle operating conditions, the surge line may be adapted in real-time. By adapting surge line in real-time, more accurate calibration of the surge line may be possible. As a result, surge mitigation/avoidance actions may be performed more accurately, thereby improving drivability and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
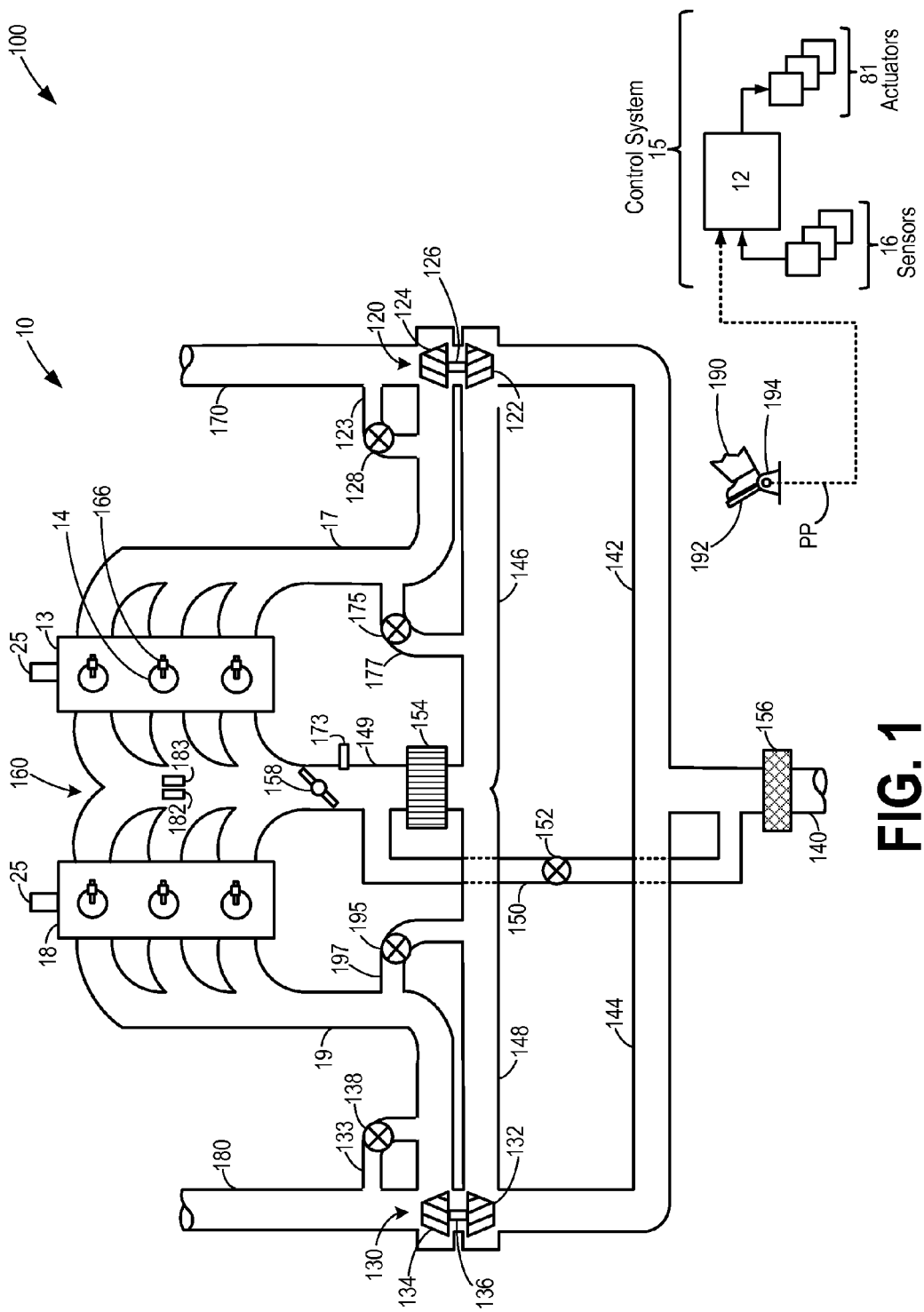
FIG. 1 depicts an example embodiment of a boosted engine system including a compressor recirculation valve (CRV).

The following description relates to systems and methods for learning surge behavior of a compressor included in a boosted engine system, such as the system of FIG. 1. A controller may be configured to perform a control routine, such as routine of FIG. 6 to perform an initial surge line adjustment. Further, the controller may perform routine of FIG. 2 and mechanism of FIG. 3 to learn adaptation of a surge line of the compressor in real-time. Still further, the controller may perform routine of FIG. 4 in order to detect faults in a CRV or a compressor recirculation passage based on the adapted surge line. Example surge line adaptations are shown at FIG. 5.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. Engine system 100 may be a split-engine system wherein intake passage 140 is branched downstream of air filter 156 into first branch and second branch intake passages, each including a turbocharger compressor. In the resulting configuration, at least a portion of intake air is directed to compressor 122 of turbocharger 120 via a first branch intake passage 142 and at least another portion of the intake air is directed to compressor 132 of turbocharger 130 via a second branch intake passage 144 of the intake passage 140.

The first portion of the total intake air that is compressed by compressor 122 may be supplied to intake manifold 160 via a first parallel branched intake passage 146. In this way, intake passages 142 and 146 form a first combined branch of the engine's air intake system. Similarly, a second portion of the total intake air can be compressed via compressor 132 and may be supplied to intake manifold 160 via second parallel branched intake passage 148. Thus, intake passages 144 and 148 form a second combined branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Common intake passage 149 may include a charge air cooler 154 and an intake throttle 158. The position of intake throttle 158 can be adjusted via a throttle actuator (not shown) communicatively coupled to controller 12. A throttle inlet pressure (TIP) sensor 173 may be coupled to common intake passage 149 at a location upstream of intake throttle 158 and downstream of air cooler 154. Further, TIP sensor 173 may be located downstream of compressors 122 and 132. Throttle inlet pressure, also referred to as the boost pressure or charging pressure, may be estimated by TIP sensor 173. In one example, the TIP sensor may be utilized to determine compressor surge conditions based on a frequency and/or amplitude of a signal from the TIP sensor. As such, the TIP sensor may have a bandwidth greater than 100 Hertz which may be suitable for detecting compressor surge.

A compressor recirculation passage 150 may be provided for compressor surge control. Specifically, to reduce compressor surge, such as on a driver tip-out, boost pressure may be dumped from the intake manifold, from downstream of air cooler 154 and upstream of intake throttle 158, to intake passage 140 (in particular, downstream of air filter 156 and upstream of the junction of intake passages 142 and 144). By flowing boosted air from upstream of an intake throttle inlet to upstream of the compressor inlets, boost pressure may be rapidly reduced, expediting boost control.

Flow through compressor recirculation passage 150 may be regulated by adjusting the position of compressor recirculation valve 152 (CRV 152) positioned therein. CRV 152 may also be termed a compressor surge valve, a compressor bypass valve (CBV), a diverter valve, etc. In the depicted example, compressor recirculation valve 152 may be a continuously variable valve whose position can be adjusted to a fully open position, a fully closed position, or any position there-between. Thus, compressor recirculation valve 152 may also be referred to herein as a continuously variable compressor recirculation valve, or CCRV. In the depicted example, CCRV 152 is configured as a throttle valve, although in other embodiments, the CCRV may be configured differently (e.g. as a poppet valve). Accordingly, CCRV 152 may include a throttle (e.g. as a throttle plate) as well as a position sensor for communicating a change in position of the throttle of the CCRV to the controller 12. The position sensor for the throttle of the CCRV (or simply CRV) may also be referred to as throttle position sensor (TPS) or CCRV throttle position sensor. It will be appreciated that while the CCRV is shown configured for a V-6 twin turbocharged engine in FIG. 1, the CCRV may be similarly applied in other engine configurations, such as applied to I-3, I-4, V-8, and other engine configurations with one or multiple turbochargers.

In an alternate configuration, the compressor recirculation passage may be located such that compressed air flows from upstream of air cooler 154 to a location upstream of compressors 122 and 132. In another configuration, there may be two recirculation paths, each with a recirculation valve, each located such that compressed air travels from the compressor exit to the compressor inlet. It will also be appreciated that the methods described herein may be applied to a compressor recirculation valve that is not continuously variable.

During nominal engine operating conditions, the continuously variable compressor recirculation valve 152 may be kept nominally closed, or nearly closed. In such a position, the valve may be operating with known or negligible leakage. Then, in response to surge, an opening of the CCRV 152 may be increased. In some embodiments, one or more sensors may be coupled in compressor recirculation passage 150 to determine the mass of recirculated flow delivered from the throttle inlet to the intake passage. The various sensors may include, for example, pressure, temperature, and/or flow sensors.

In alternate embodiments, the compressor recirculation valve may be configured as a two-position valve adjustable to one of a fully closed and a fully open position. However, boost regulation may be improved by using a CCRV. In addition, by coordinating the operation of the CCRV with those of a wastegate, boost response and surge margins can be improved. As such, the impact of the opening or closing of the CCRV 152 on boost pressure may be substantially immediate. This allows rapid boost and surge control.

Engine 10 may include a plurality of cylinders 14. In the depicted example, engine 10 includes six cylinders arranged in a V-configuration. Specifically, the six cylinders are arranged on two banks, first bank 13 and second bank 18, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific parallel exhaust passages. In the depicted example, first bank 13 of cylinders of engine 10 can exhaust products of combustion via a first parallel exhaust passage 17 and second bank 18 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass exhaust turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of intake passage 144 of the engine's intake system. Alternatively, some or all of the exhaust gas flowing through exhaust passage 19 can bypass exhaust turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors (not shown).

In some embodiments, engine 10 may further include one or more exhaust gas recirculation (EGR) passages for recirculating at least a portion of exhaust gas from first and second parallel exhaust passages 17 and 19 and/or first and second parallel branched exhaust passages 170 and 180, to first branch and second branch intake passages 142 and 144, and/or first and second parallel branched intake passages 146 and 148 or intake manifold 160. These may include high-pressure EGR loops for providing high-pressure EGR (HP-EGR) and low-pressure EGR-loops for providing low-pressure EGR (LP-EGR). When included, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously. The low-pressure EGR loops may recirculate at least some exhaust gas from each of the branched parallel exhaust passages, downstream of the exhaust turbine, to the corresponding branch of intake passage, upstream of the compressor. Each of the LP-EGR loops may have corresponding LP-EGR valves, for controlling exhaust flow through the LP-EGR loop, as well as respective charge air coolers for lowering a temperature of exhaust gas recirculated to the engine intake. The high-pressure EGR loops may recirculate at least some exhaust gas from each of the parallel exhaust passages, upstream of the exhaust turbine, to the corresponding parallel intake passage, downstream of the compressor. As shown, high-pressure EGR loop 177 can recirculate a portion of exhaust gas from first parallel exhaust passage 17 to first parallel branched intake passage 146. Similarly, high-pressure EGR loop 197 may recirculate at least some exhaust gas from second parallel exhaust passage 19 to second parallel branched intake passage 148. EGR flow through the HP-EGR loops may be controlled via respective HP-EGR valves and HP-EGR charge air coolers (not shown). Thus, EGR flow through high-pressure EGR loop 197 may be controlled by HP-EGR valve 195, while EGR flow through high-pressure EGR loop 177 is controlled by HP-EGR valve 175.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. Cam actuation systems may include one or more cams mounted on one or more camshafts and may utilize one or more of cam profile switching (CPS), variable cam timing (VCT), variable valve timing (VVT) and/or variable valve lift (VVL) systems that may be operated by controller 12 to vary valve operation.

Engine system 100 may be controlled at least partially by a control system 15 including controller 12 and by input from a vehicle operator 190 via an input device 192. In this example, input device 192 includes an accelerator pedal and a pedal position sensor 194 for generating a proportional pedal position signal PP.

Control system 15 is shown receiving information from a plurality of sensors 16 (various examples of which are described herein) and sending control signals to a plurality of actuators 81. As one example, sensors 16 may include TIP sensor 173, a humidity sensor, MAP sensor 182, and MCT sensor 183. In some examples, a throttle inlet temperature sensor for estimating a throttle air temperature (TCT) may be located upstream of intake throttle 158. In other examples, one or more of the EGR passages may include pressure, temperature, and air-to-fuel ratio sensors, for determining EGR flow characteristics. As another example, actuators 81 may include CCRV 152, fuel injector 166, HP-EGR valves 175 and 195, LP-EGR valves (not shown), intake throttle 158, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-4. Controller 12 may store one or more maps (e.g. compressor map 500 at FIG. 5) in a memory of the controller.

In one example, the system of FIG. 1 provides for a turbocharger system of an internal combustion engine, comprising: a compressor; a throttle inlet pressure sensor located downstream of an outlet of the compressor and upstream of an intake throttle; a controller with computer readable instructions for: in response to a request to learn a compressor surge line adaptation, detecting a compressor surge event based on an amplitude of the pressure sensor greater than a threshold amplitude in a threshold frequency range; determining a number of compressor surge events in a first compressor map region including a first map point on the compressor map at which the surge event is detected; and in response to the number of surge events in the first map region greater than a threshold number, retarding a first surge line region including a first and a second surge line point located on a surge line; and wherein a distance between each of the first and the second surge line point and the first map point is less than a distance between each of remaining surge line points on the surge line and the first map point.

The system further includes wherein the controller includes further instructions for, in response to the request to learn the surge line adaptation, detecting an absence of the compressor surge during a tip-out greater than a threshold; determining a number of tip-out events in a second compressor map region including a second map point on the compressor map at which the tip-out is detected; and in response to the number of tip-out events in the second region greater than a threshold number of tip-outs, advancing a second surge line region including a third and a fourth surge line point located on the surge line; and wherein a distance between each of the third and the fourth surge line points and the second map point is less than a distance between each of remaining surge line points on the surge line and the second map point.

The system still further includes wherein the controller includes further instructions for, linking the first region and the second region via linear interpolation; and wherein the first region is adjacent to the second region.

In another example, the system of FIG. 1 provides for an engine system, comprising: an engine; a turbocharger for providing a boosted air charge to the engine, the turbocharger including an exhaust turbine and an intake compressor; a continuously variable recirculation valve coupled across the compressor; a throttle coupled to the intake, downstream of the compressor; a throttle inlet pressure sensor located downstream of the compressor and upstream of the throttle; and a controller with computer readable instructions for, detecting degradation of the continuously variable recirculation valve based on adaptation of a surge line of a compressor map stored in a memory of the controller.

The method further includes wherein the controller includes further instructions for indicating the recirculation valve stuck closed in response to an area to the left of the surge line greater than a first threshold area and for indicating the recirculation valve stuck open in response to an area to the left of the surge line less than a second threshold area.

Figure 2:
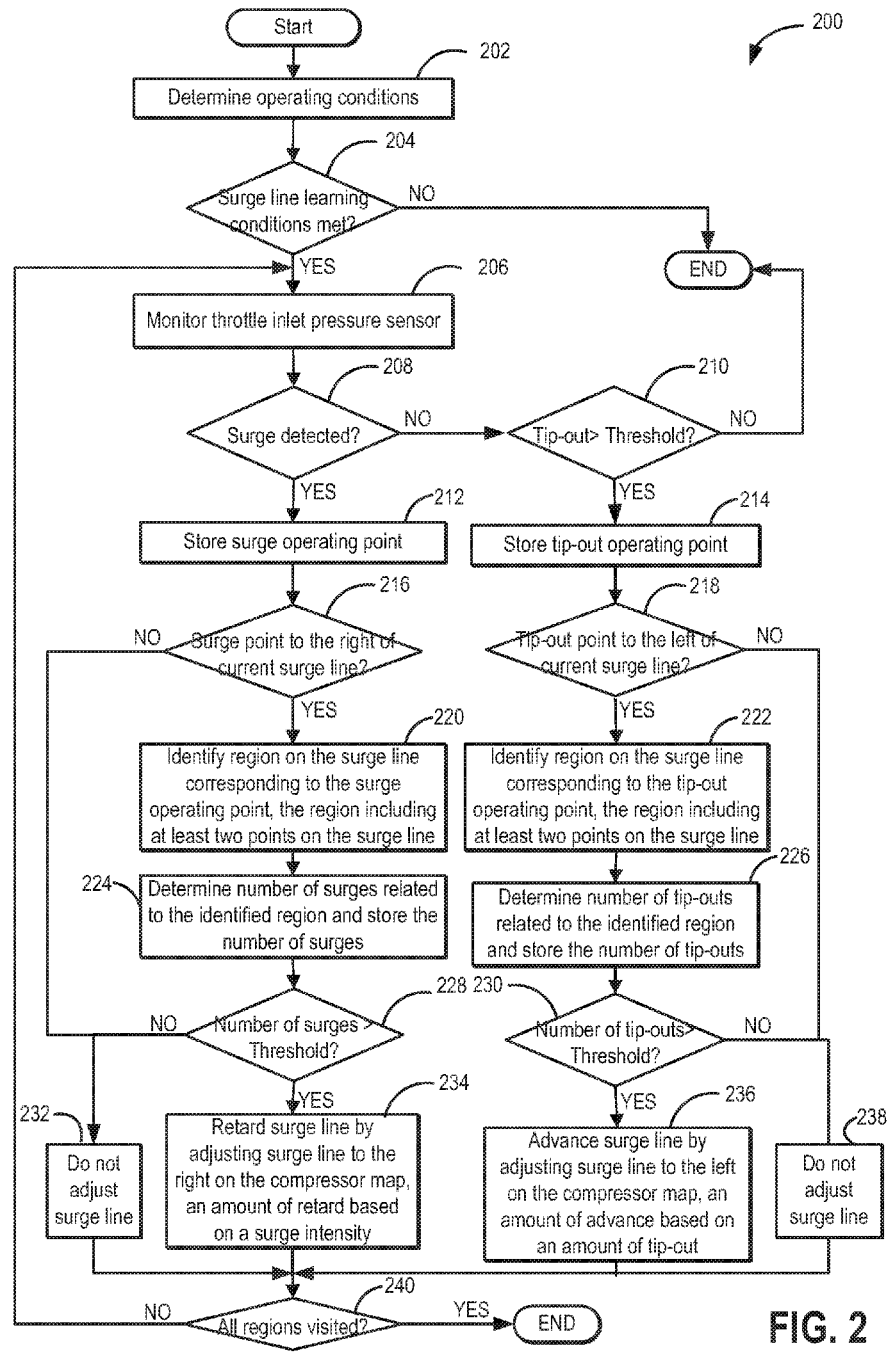
FIG. 2 shows a high level flow chart illustrating an example routine for adjusting a surge line on a compressor map.

Turning to FIG. 2, method 200 for adjusting a compressor surge line on a compressor map is shown. In particular, by utilizing method 200 of FIG. 2, the surge line may be adapted in real-time during one or more normal drive cycles. By adjusting the surge line in real-time, surge behavior of the compressor may be learnt under most recent vehicle operating conditions. The method of FIG. 2 may be included in the system of FIG. 1 as executable instructions stored in non-transitory memory.

At 202, method 200 includes estimating and/or measuring operating conditions. Operating conditions may include but are not limited to engine speed, engine load, accelerator position, throttle position, compressor pressure ratio, compressor flow, throttle inlet pressure frequency, and duration of engine operation.

Upon determining the operating conditions, method 200 may proceed to 204. At 204, method 200 may include judging if conditions are present for learning and adapting the surge line. In one example, method 200 may judge that conditions are present for adjusting the surge line when a threshold number of miles are reached. In other examples, method 200 may judge that conditions are present for adjusting the surge line when a threshold number of surge events are detected. In yet another example, method 200 may judge that learning conditions are present when a threshold number of aggressive tip-out events that do not result in surge is reached. Further still, learning of the surge line may be initiated if a threshold duration has elapsed since a last adjustment of the surge line. If method 200 judges that conditions are present for adjusting the surge line, the answer is yes and method 200 proceeds to 204.

At 206, method 200 includes monitoring a frequency of a signal (e.g. pressure signal) output at various frequency ranges from a throttle inlet pressure sensor. A throttle inlet pressure sensor (e.g. sensor 173 at FIG. 1) may be located downstream of an outlet of a compressor. In one example, additionally or alternatively an amplitude of the signal output from the throttle position sensor may be determined. Method 200 proceeds to 208 upon determining the throttle inlet pressure sensor frequency and amplitude.

At 208, method 200 includes judging if a compressor surge event is detected based on the frequency and amplitude of the signal from the TIP sensor. As such, during surge conditions, pressure oscillations of high amplitude and frequency may be generated. By monitoring the pressure signals downstream of the compressor via the TIP sensor, compressor surge events may be detected. In one example, a compressor surge event may be detected based on the frequency of the signal from the TIP sensor greater than a threshold frequency. In other examples, in addition to or alternative to the frequency, the compressor surge event may be detected based on the amplitude of the TIP sensor signal greater than a threshold amplitude in a threshold frequency range. If the answer at 208 is YES, the compressor surge event is detected and method 200 proceeds to 212. If the answer at 208 is NO, the compressor is not operating under surging conditions and method proceeds to 210.

At 212, method 200 includes storing an operating point on a compressor map (e.g. map 500—at FIG. 5) including a compressor pressure ratio and a compressor mass flow at which the surge event was detected to memory of a controller (e.g. controller 12 at FIG. 1). Upon storing the operating point, method 200 may proceed to 216.

At 216, method 200 includes judging if the operating point at which the surge occurred (herein referred to as a surge operating point) is located to the right of a current surge line. In one example, the current surge line may be a surge line calibrated by the manufacturer. In some examples, the current surge line may be a surge line that has been calibrated in real-time during a previous learning cycle. As discussed above, occurrence of surge may be determined based on the pressure signal from the TIP sensor.

If the answer at 216 is NO, then the compressor is surging in the surge region (region to the left of the surge line or on the surge line). Accordingly, the surge line may not be adapted Therefore, upon determining that the surge operating point is not located to the right of the surge line, method 200 may proceed to 232. At 232, the current surge line may be maintained without any adjustment. That is, a delta adjustment at 232 may be zero. Further, at 232, a region on the surge line corresponding to the operating point on the compressor map at which the surge is detected and zero delta adjustment is made may be identified and stored. From 232, method 200 may proceed to 240 to determine if all the regions of the surge line are visited. At 240, if the answer is YES, method 200 may end. If NO, method 200 may return to step 206.

Returning to 216, if the answer at 216 is YES, then the compressor is surging in a non-surge region (region to the right of the surge line) of the compressor map. Accordingly, the surge line may need to be adapted to obtain a correct surge line. Upon determining that the surge operating point is located to the right of the surge line, method 200 may proceed to 220.

At 220, method 200 includes identifying a region on the surge line corresponding to the surge operating point. For example, the region on the surge line may include two or more data points on the surge line (herein each data point on the surge line may be referred to as a surge line data point) that are closest to the surge operating point on the compressor map compared to the remaining data points on the surge line.

Next at 224, upon identifying the region on the surge line, method 200 includes determining a number of surges that identify the region on the surge line and further includes storing the number of surges that identify the region on the surge line. In other words, the number of surges corresponding to the identified region on the surge line may be determined and stored. For example, a first surge operating point may result in identifying a first region on the surge line that includes at least two surge line data points that are closest to the first surge operating point; and a second surge operating point may also result in identifying the first region on the surge line (due to the first region on the surge line including at least two surge line data points closest to the second surge operating point, for example). Consequently, the number of surges that identify the first region on the surge line may be stored as two. Subsequently, if a third surge operating point also results in identifying the first region on the surge line, the number of surges that identify the first region may be incremented to three. Similarly, if a fourth surge operating point results in identifying a second region on the surge line for a first time, the number of surges that identify the second region may be stored as one, and so on.

Next, method 200 may proceed to 228. At 228, method 200 may include judging if the number of surges that identify the region on the surge line (also referred to herein as surge line region) is greater than a threshold number. In one example, the threshold number may be a selected number for all regions on the surge line. The selected number may be based on a magnitude of detected surge. For example, as the magnitude of the detected surge increases, the threshold number of surges before adapting may decrease. That is, larger surges may require fewer number of surge events before adapting. In one example, the threshold number may be based on a standard deviation of a particular compressor characteristic based on part-to-part variability, or a calibration constant based on experiments. In some examples, the threshold number may be based on a position of the surge line region on the compressor map. For example, if the identified region includes a threshold number of surge line data points, each having a compressor pressure ratio greater than a threshold ratio, the threshold number of surges may be lower compared to the threshold number of surges when the identified region includes a threshold number of surge line data points, each having a compressor pressure ratio less than the threshold ratio. If the answer at 228 is YES, the number of surges is greater than the threshold number and consequently, method 200 may proceed to 234.

At 234, method 200 includes retarding the surge line by adapting the current surge line to the right of the current surge line. In one example, a local adjustment may be performed, which includes retarding the region of the surge line (that is, the region identified by the number of surge operating points, the number greater than the threshold) while the remaining regions may maintain a current position on the map. In another example, global surge line adjustments may be performed. That is, the entire surge line, including all the regions of the surge line, may be retarded based on the local adjustment. An amount of retard (also referred to herein as delta retard adjustments) may be a calibratable constant. For example, the calibratable constant may be a percentage of the corrected mass flow rate. In some examples, the delta retard adjustment may be based on an intensity of the surge event or an average intensity of the number of surge events. Upon performing delta retard adjustments, method 200 may proceed to 240 to determine if all the regions of the surge line are visited. If YES, method 200 may end. If NO, method 200 may return to step 206.

Returning to 208, if it is determined that the compressor is not operating under surging conditions; method 200 may proceed to 210. At 210, method 200 includes confirming if a large tip-out event has occurred. For example, a large tip-out may be confirmed based on a tip-out greater than a threshold amount. As such, confirming a tip-out event may include determining if the operator has released an accelerator pedal. Further, confirming a large tip-out event may include determining if a change in an accelerator pedal position during the tip-out is greater than a threshold change. In one example, in response to the large tip-out operation, torque demand may drop from a higher torque demand to a lower torque demand below the threshold demand. In another example, in response to the tip-out operation, the torque demand may drop from the higher torque demand to a minimum torque demand. If it is determined that a large tip-out operation has occurred, method 200 may proceed to 214. If at 210, the large tip-out is not detected, method 200 may end.

At 214, method 200 may include storing an operating point on the compressor map (e.g.) including a compressor pressure ratio and a compressor mass flow at which the large tip-out event was detected to memory of a controller (e.g. controller 12 at FIG. 1). Upon storing the operating point, method 200 may proceed to 218.

At 218, method 200 includes judging if an operating point at which the tip-out occurred (herein referred to as a tip-out operating point) is located to the left of the current surge line. In one example, the current surge line may be a surge line calibrated by the manufacturer. In some examples, the current surge line may be a surge line that has been calibrated in real-time during a previous learning cycle.

If the answer at 218 is NO, then the compressor is not surging when the tip-out operating point is in the non-surge region (region to the right of the surge line). Accordingly, the surge line may not be adapted. Therefore, upon determining that the tip-out operating point is not located to the left of the surge line, method 200 may proceed to 238. At 238, the current surge line may be maintained without any adjustment. That is, at 238, zero adjustments may be made. Further, at 238, a region on the surge line corresponding to the operating point on the compressor map at which the tip-out is detected and zero adjustments are made may be identified and stored. Upon performing zero adjustments, method 200 may proceed to 240 to determine if all the regions of the surge line are visited. If YES, method 200 may end. If NO, method 200 may return to step 206.

Returning to 218, if the answer at 218 is YES, then the compressor is not surging (during large tip-out) in a surge region (region to the left of the surge line) of the compressor map. Accordingly, the surge line may need to be adapted to obtain a correct surge line. Upon determining that the tip-out operating point is located to the left of the surge line, method 200 may proceed to 222.

At 222, method 200 may include identifying a region on the surge line corresponding to the tip-out operating point. For example, the region on the surge line may include two or more data points on the surge line (that is, the surge line data points) that are closest to the tip-out operating point on the compressor map compared to the remaining data points on the surge line.

Next at 226, upon identifying the region on the surge line, method 200 includes determining a number of tip-out events that identify the region on the surge line (that is, the region on the surge line identified at step 222), and further includes storing the number of tip-out events that identify the region on the surge line. In other words, the number of tip-outs corresponding to the identified region on the surge line may be determined and stored. For example, a first tip-out operating point may result in identifying a first region on the surge line that includes at least two surge line data points that are closest to the first tip-out operating point; and a second tip-out operating point may also result in identifying the first region on the surge line (due to the first region on the surge line including at least two surge line data points closest to the second tip-out operating point, for example). Consequently, the number of tip-out events that identify the first region on the surge line may be stored as two. Subsequently, if a third tip-out operating point also results in identifying the first region on the surge line, the number of surges that identify the first region may be incremented to three. Similarly, if a fourth tip-out operating point results in identifying a second region on the surge line, the number of tip-out events that identify the second region may be stored as one, and so on.

Next, method 200 may proceed to 230. At 230, method 200 may include judging if the number of tip-out events that identify the region on the surge line (also referred to herein as surge line region) is greater than a threshold number of tip-out events. In one example, the threshold number may be a selected number for all regions on the surge line. The selected number may be based on a magnitude of tip-out. For example, as the magnitude of tip-out increases, the threshold number of tip-out events may decrease. In other words, larger tip-out events may require lesser number of tip-out events before adapting. In one example, the threshold number of tip-out events may be based on a standard deviation of a particular compressor characteristic based on part-to-part variability, or a calibration constant based on experiments. In some examples, the threshold number may be based on a position of the surge line region on the compressor map. For example, if the identified region includes a threshold number of surge line data points, each having a compressor pressure ratio greater than a threshold ratio, the threshold number of tip-out may be lesser than the threshold number of tip-out events when the identified region includes a threshold number of surge line data points, each having a compressor pressure ratio less than the threshold ratio. If the answer at 230 is YES, the number of tip-out events is greater than the threshold number and consequently, method 200 may proceed to 236.

At 236, method 200 includes advancing the surge line by adapting the current surge line to the left of the current surge line. In one example, a local adjustment may be performed, which includes advancing the region of the surge line (that is, the region identified by the number of surge operating points, the number greater than the threshold) while the remaining regions may maintain a current position on the map. In another example, global surge line adjustments may be performed based on the local adjustment. That is, the entire surge line, including all the regions of the surge line, may be retarded based on the local adjustment.

An amount of advancement made (also referred to herein as delta advance adjustments) may be a calibratable constant. For example, the calibratable constant may be a percentage of the corrected mass flow rate. In some examples, the delta advance adjustment may be based on an intensity of the surge event. Further still, the delta adjustment may be based on a life stage of the vehicle. For example, delta adjustments in newer vehicles may be greater if the current surge line is based on the manufacturer calibration as the manufacturer calibration is based on a worst case scenario. In other words, an initial delta adjustment (including a first real-time adjustment of a manufacturer surge line) may be greater than subsequent adjustments. Further, initial delta adjustment of the manufacturer surge line may include advancing the manufacturer surge line as the manufacturer surge line may be calibrated (by the manufacturer) conservatively (in other words, more retarded) based on a worst case scenario. Details of performing the initial surge line adjustment of the manufacturer surge line will be elaborated with respect to FIG. 6.

Upon performing delta advance adjustments, method 200 may proceed to 240 to determine if all the regions of the surge line are visited. If YES, method 200 may end. If NO, method 200 may return to step 206.

In one example, local adjustments may be made (that is, only one or more regions of the surge line may be retarded or advanced) and upon determining that all the regions of the surge line are visited, global adjustments may be performed by linking all the regions via linear interpolation. For example, if a surge line includes ten regions, and only five regions are visited (wherein the adjustment may include retarding based on surge events or advancing based on tip-out events or the adjustment may be zero), the controller may wait until all the ten regions are visited and adapted. Upon determining that all the ten regions are visited and adapted, global adjustments may be made by linking the adapted regions, wherein the adapted regions may be linked via linear interpolation.

In some examples, during a learning cycle, a first region of the surge line may be advanced, a second region of the surge line may be retarded, and no adjustment may be made to a third region of the surge line. Subsequently, upon visiting all the regions of the surge line, the visited regions may be linked globally via linear interpolation to determine a new surge line. The globally adapted surge line may be utilized to determine compressor surge conditions during subsequent drive cycles when the surge line is not being adapted.

Further, during a learning condition, a surge line region that is adapted (by either retarding or advancing) may not be re-adapted during the learning condition until all the surge line regions are visited.

As such, delta adjustments performed during retarding the surge line (the adjustment may be local or global) may be greater than delta adjustments performed during advancing the surge line. In other words, a retard gain may be greater than an advancing gain.

Further, a limit for advancing and retarding adjustments (the adjustment may be local or global) may be determined. For example, when performing advancing adjustments, the surge line region and/or the surge line may not be adapted beyond a zero corrected mass flow. That is, the y axis of the compressor map (representing the zero corrected mass flow) may be defined as the advancing limit. When performing retard adjustments, the surge line region and/or the surge line may not retarded beyond the manufacturer surge line. In other words, the manufacturer surge line may be defined as the retarding limit.

In this way, based on compressor surge events, the surge line may be adapted in real-time. By adapting surge line in real-time based on surge events, more accurate calibration of the surge line may be possible. As a result, surge mitigation/avoidance actions may be performed more accurately thereby improving drivability and fuel economy.

In one example, method of FIG. 2 may provide for a method for an engine including a compressor, comprising: detecting a surge event of the compressor based on a frequency content of a throttle inlet pressure sensor located downstream of the compressor; and adapting a surge line of a compressor map stored in a controller of the engine based on a compressor pressure ratio and a corrected compressor flow during the surge event. The method may further comprise, in response to not detecting a surge and a tip-out greater than a threshold amount, advancing a region of the surge line corresponding to a region on the compressor map, the region on the map including a data point corresponding to the compressor pressure ratio and corrected compressor flow at which the tip-out occurred; and further comprising advancing the region of the surge line by a first selected amount. Still further, the method may comprise advancing the region of the surge line in response to a number of tip-outs greater than a threshold number and not detecting surge at each of the number of tip-outs; and wherein each of the number of tip-outs is greater than the threshold amount and occurring in the region on the compressor map.

The method includes wherein the first selected amount is based on one or more of a life cycle of the engine, and an amount of tip-out, and further comprises advancing the region of the surge line in response to the region on the compressor map located to the left of the surge line; and retarding a region of the surge line corresponding to the compressor pressure ratio and corrected compressor flow at which the surge occurred by a second selected amount; and wherein the second selected amount is based on one or more of a life cycle of the engine, and a surge intensity.

The method further comprises retarding the region of the surge line in response to a number of surge events greater than a threshold number of surge events; and wherein, each surge event occurs at a region on the compressor map corresponding to the region on the surge line; and further comprises retarding the region of the surge line in response to the region on the compressor map located to the right of the surge line.

Still further, the method includes globally advancing the entire surge line in response to detecting a number of tip-outs greater than a threshold number and not detecting the surge event during each of the number of tip-outs, each tip-out greater than a threshold amount, and globally retarding the entire surge line in response to detecting a number of surge events greater than a threshold number.

In another example, the method of FIG. 2 provides for a method for a turbocharged engine including a compressor, comprising: in response to a request to learn a compressor surge line, during a first condition, adjusting the surge line by locally advancing at least a first point and a second point on a surge line of a compressor map; determining an advancing gain; and globally advancing a first set of remaining points on the surge line based on the advancing gain; and during a second condition, adjusting the surge line by locally retarding at least a third point and a fourth point on the surge line; determining a retarding gain; and globally retarding a second set of remaining points on the surge line based on the retarding gain.

The method includes wherein the first condition includes a tip-out greater than a threshold amount and the compressor not surging during the tip-out; and wherein the tip-out occurs at fifth point on the compressor map, the fifth point located to a left side of the surge line on the compressor map, and wherein the fifth point on the map is located closer to the first and the second points on the surge line than the first set of remaining points on the surge line.

The method further includes wherein the second condition includes detecting a compressor surge event based on a frequency of a throttle inlet pressure sensor located downstream of an outlet of the compressor; and wherein the surge event occurs at a sixth point on the compressor map, the sixth point located to a right side of the surge line on the compressor map, and wherein the sixth point on the map is located closer to the third and the fourth points on the surge line than the second set of remaining points on the surge line.

The method further comprises advancing a first region including the first point and the second point during the first condition, and further comprising retarding a second region including the third point and the fourth point during the second condition, and wherein the first region is separate from the second region. Further, the method comprises not retarding the advanced first region until all regions on the surge line are adjusted; and further comprising not advancing the retarded second region until all the regions on the surge line are adjusted.

Still further, the method comprises during the first condition, advancing the first region in response to a number of tip-outs occurring in a third region on the map greater than a first threshold number; and further comprising retarding the second region in response to a number of surge events occurring in a fourth region on the map greater than a second threshold number; and wherein at each of the number of tip-outs, the tip-out is greater than the threshold amount and the compressor is not surging. The method includes wherein the third region includes the fifth point; and wherein the fourth region includes the sixth point.

Figure 3:
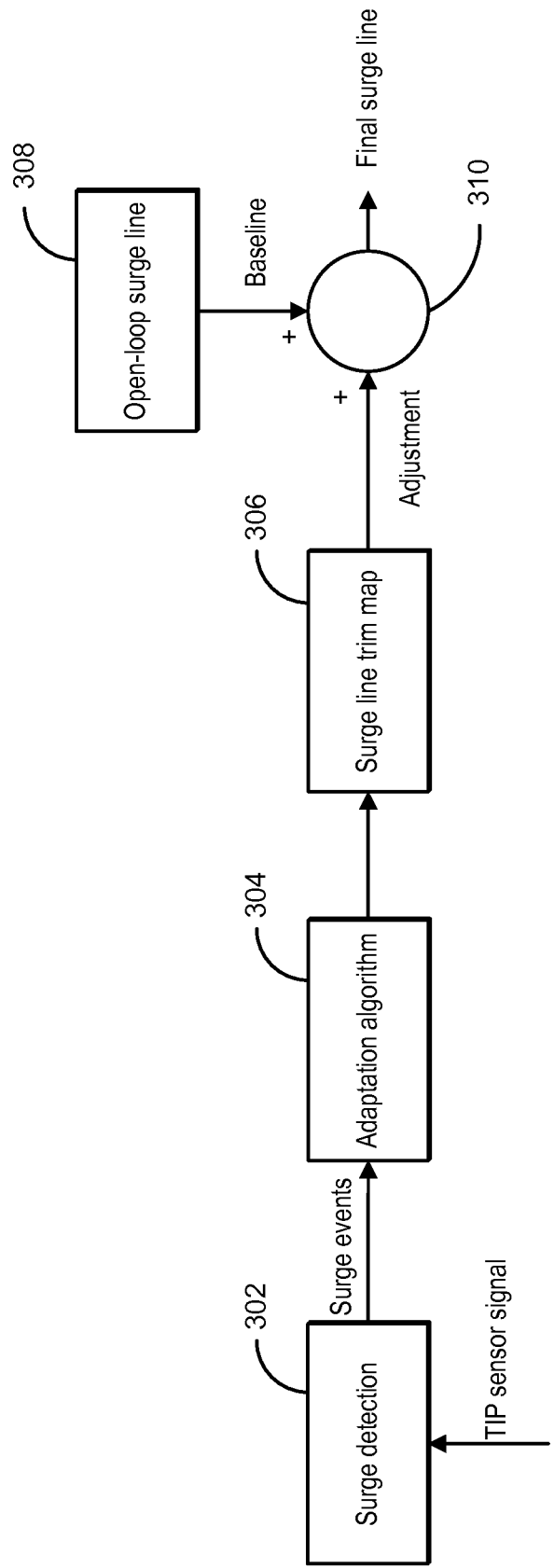
FIG. 3 shows a block diagram illustrating surge line adaptation.

Turning now to FIG. 3, a block diagram 300 for adaptation of a surge line on a compressor map is shown. For example, a surge line may divide the compressor map into a surge region and a non-surge region and may be utilized to determine conditions when a compressor may surge. Specifically, when a compressor operating point is located to the left of the compressor surge line, it may be determined that the compressor is operating under surge conditions and accordingly control actions (such as opening a compressor recirculation valve) may be taken to mitigate or avoid compressor surge. When the compressor operating point is located to the right of the compressor surge line, it may be determined that the compressor is not operating under surge conditions. Thus a position of the surge line on the compressor map may determine if the compressor is operating under surge or non-surge conditions. Therefore, learning the surge line in real-time may result in more accurate surge line adaptations.

At 302, a controller may detect a compressor surge event based on an input from a TIP sensor. As such, the TIP sensor may send pressure signals to the controller, and based on a frequency of the pressure signal greater than a threshold frequency, and/or an amplitude of the pressure signal greater than a threshold, the surge event may be detected. Further, a number of surge events detected at the operating point may be determined. If no surge is detected, the controller may determine if an aggressive tip-out has occurred. Further the controller may determine a number of aggressive tip-outs at operating points at which no surge was detected.

Next, at 304, the operating point of the compressor at which the surge or the aggressive tip-out occurred, and a number of surges or aggressive tip-out events at the operating point may be utilized by an adaptation algorithm to generate a surge line trip map. For example, the adaptation algorithm may be utilized to learn surge condition in real-time and adapt (advance or retard) surge line accordingly. Further, the adaptation algorithm may be utilized to make global and/or local adjustments. Specifically, if a surge is detected, the adaptation algorithm may determine and perform a local retarding adjustment of a region corresponding to the compressor operating point at which the surge occurred; and if a no-surge aggressive tip-out condition has occurred, the adaptation algorithm may determine and perform a local advancing adjustment. Additionally, or alternatively, a global retard adjustment or a global advance adjustment of multiple regions of the surge line or the entire surge line may be determined by the adaptation algorithm. Details of the adapting the surge line (including local and global adaptations) are elaborated with respect to FIG. 2.

Next, at 306, a surge line trip map with global and/or local adjustments may be generated based on the adaptation algorithm. Next, at 310, a final surge line may be generated based on the surge line trim map and a baseline surge line (308). For example, the delta adjustments from the surge line trim map may be incorporated into the baseline surge line and the final surge line may be determined as a sum of the baseline surge line and the final surge line. In one example, the baseline surge line may be a manufacturer surge line. In other examples, the baseline surge line may be a surge line that has been calibrated in real-time during a previous learning cycle.

In this way, the adaptation algorithm may be utilized to learn surge behavior of the compressor under most recent vehicle operating conditions.

Figure 4:
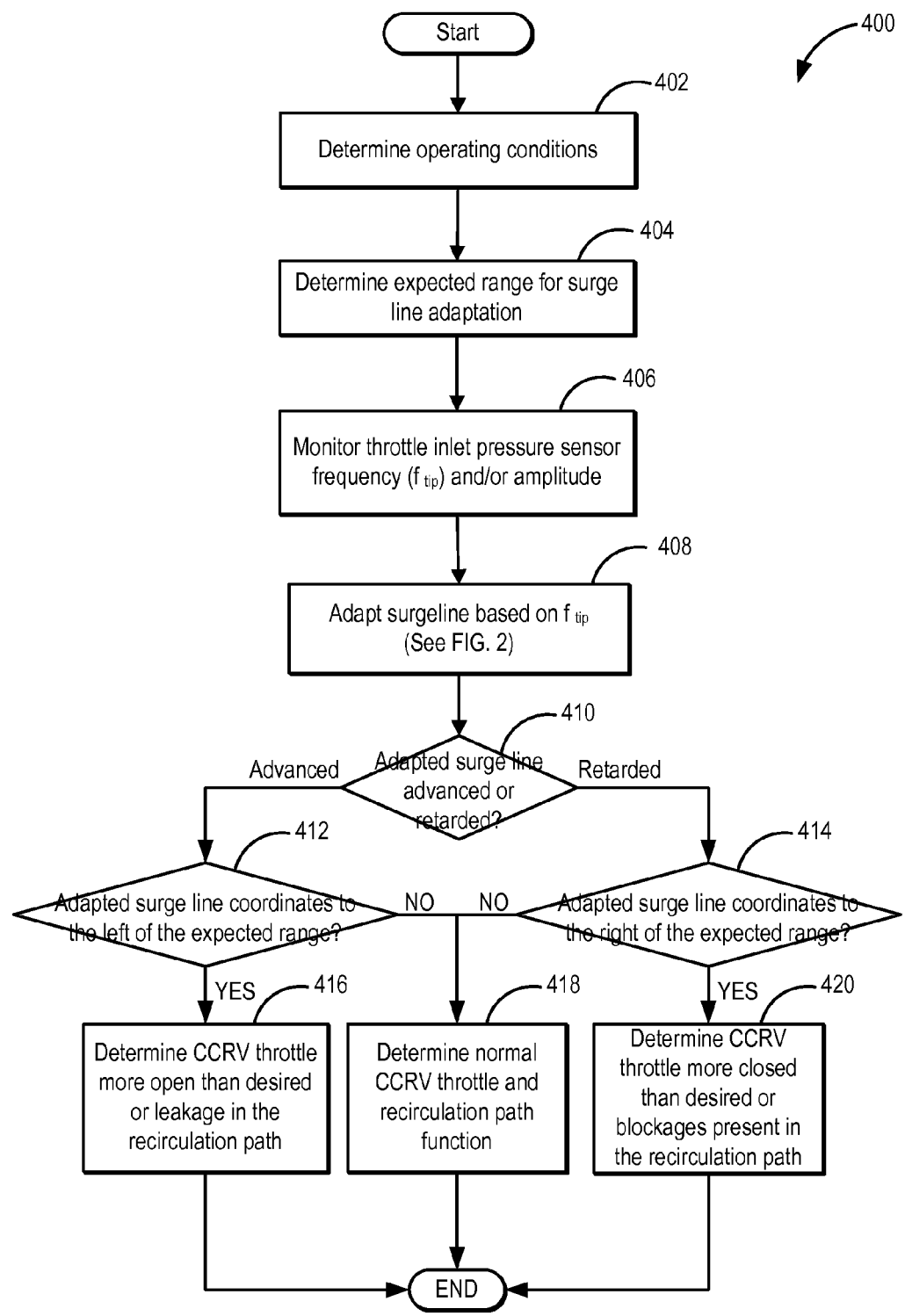
FIG. 4 shows a high level flow chart for identifying faults with the CRV based on surge line adaptation
Figure 5:
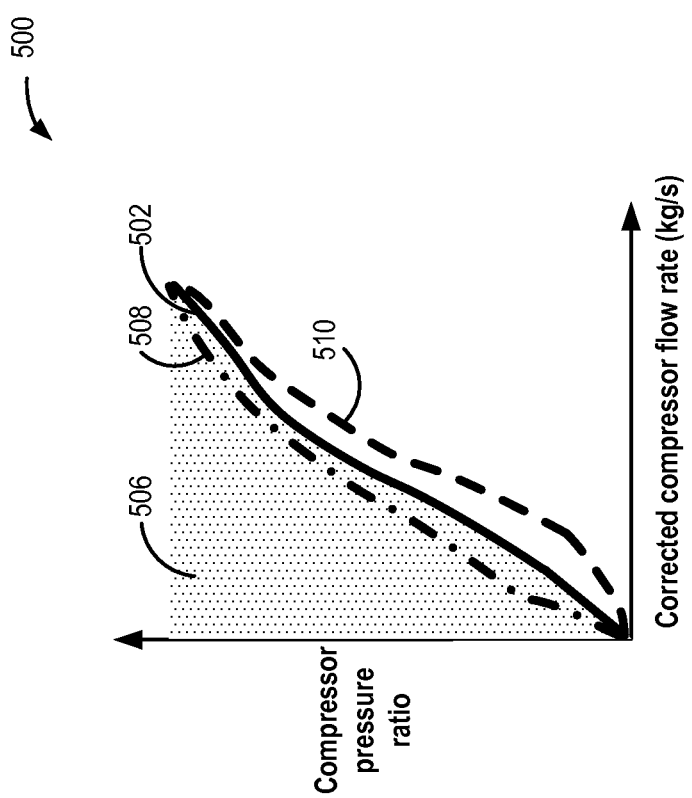
FIG. 5 shows an example compressor map depicting adapted surge lines.

Turning to FIG. 4, a method 400 for identifying malfunction of a compressor recirculation valve (e.g. valve 152 at FIG. 1) throttle based adaptation of a surge line on a compressor map is shown. In some examples, valve 152 may be a continuously variable compressor recirculation valve (CCRV). The method of FIG. 4 may be included in the system of FIG. 1 as executable instructions stored in non-transitory memory.

At 402, method 400 includes estimating and/or measuring operating conditions. Operating conditions may include but are not limited to engine speed, engine load, accelerator position, throttle position, compressor pressure ratio, compressor flow, throttle inlet pressure frequency, and duration of engine operation.

Next at 404, method 400 may include determining an expected range for surge line adaptation. Specifically, a surge line advance limit and a surge line retard limit may be determined. The advance and retard limits for the surge line may be based on a configuration of an engine system for a particular vehicle which may include but not limited to a compressor configuration and an intake system configuration. The advance and retard limits may be further based on an expected lifetime of the intake system and part-to-part variability of the intake system including the turbo compressor, the turbine, and the CCRV. In some examples, the advance limit may be based on a zero corrected mass flow (y axis of the compressor map). The worst of worst case scenario surge line or (calibrated surge line) may be used as the retard limit. Upon determining the expected range for surge line adaptation, method 400 may proceed to 406.

Next, at 406, method 400 includes monitoring a frequency and/or amplitude of a pressure signal output from a throttle inlet pressure sensor (e.g. sensor 173 at FIG. 1) may be located downstream of an outlet of a compressor. Method 400 proceeds to 408 upon monitoring the throttle inlet pressure sensor frequency.

At 408, method 400 may include adjusting the surge line on the compressor map in real-time during one or more drive cycles based surge conditions determined based on the frequency and/or amplitude of the signal from the throttle inlet pressure sensor. For example, the surge line may be retarded in response to detecting a surge in a non-surge region (region to the right of the surge line) of the compressor map, wherein the surge is detected based on the frequency and/or amplitude of the TIP sensor signal greater than a threshold frequency/amplitude. Further, the surge line may be advanced in response to not detecting a surge (frequency and/or amplitude of the TIP sensor less than the threshold frequency/amplitude) during expected surge operating conditions on the compressor map. That is, the surge line may be advanced in response to not detecting a surge based on the TIP sensor when the operating point is in a surge region (region to the left of the surge line) of the compressor map. For example, during a tip-out greater than a threshold resulting in locating the operating point in the surge region of the compressor map and not detecting surge, the surge line may be advanced. Further, adapting the surge line may include performing local and/or global adjustments. Details of surge line adaptation are further elaborated at FIG. 2.

Upon adjusting the surge line, method 400 may proceed to 410. At 410, method 400 may include judging if the adapted surge line is advanced or retarded from an initial surge line. In some examples, it may be determined if a majority of the surge line is advanced or retarded based on a number of regions advanced or retarded. As such, the initial surge line may be a surge line on the map prior to adjusting. In some examples, the initial surge line may be a manufacturer calibrated surge line. In further examples, the initial surge line may be a surge line at the start of a learning cycle. The adapted surge line may be a globally adapted surge line.

In one example, if an area to the left of the adapted surge line is less than an area to the left of the initial surge line, it may be determined that the surge line is advanced. Likewise, if the area to the left of the adapted surge line is greater than the area to the left of the initial surge line, it may be determined that the surge line is retarded. In another example, if the adapted surge line is located to the left of the initial surge line, it may be determined that the adapted surge line is advanced. If the adapted surge line is located to the right of the initial surge line, it may be determined that the adapted surge line is retarded. If method 400 judges that the adapted surge line or a majority of the adapted surge line is advanced, method 400 proceeds to 412. If method 400 judges that the adapted surge line or a majority of the adapted surge line is retarded, method 400 proceeds to 414.

At 412, method 400 includes judging if the adapted surge line is to the left of the advance limit. In one example, it may be determined if an area to the left of the adapted surge line is less than a threshold advance area. The threshold advance area may be based on an engine system configuration for a particular vehicle which may include but not limited to a compressor configuration and an intake system configuration and may be further based on a maximum part-to-part variability and change over time for functioning system components. In some examples, the threshold advance area may be based on engine displacement and/or intake system volume directly related to engine displacement. If the answer at 412 is YES, the adapted surge line is outside the expected advance limit and accordingly, method 400 proceeds to 416. If the answer is NO, the adapted surge line is within the expected advance limit and accordingly, method 400 proceeds to 418.

At 416, method 400 may include determining that the CCRV throttle is more open than desired or a leakage may be present in the recirculation passage (e.g. compressor recirculation passage 150 at FIG. 1). For example, a malfunctioning CCRV throttle that is more open than desired or a leakage in the compressor recirculation path increases flow through the compressor. Consequently, compressor may not surge under expected surge conditions (such as a large tip-out greater than a threshold) due to the increased compressor flow. Upon not detecting surge under expected conditions, the surge line may continue to adapt the surge line to the left. That is, in response to not detecting compressor surge under expected conditions such as the large tip-out, the surge line continue to be advanced beyond the advance limit. Therefore, upon judging that the surge line is adapted to the left of the advance limit, method 400 may determine that the CCRV throttle is stuck open or method 400 may determine that a leakage is present in the recirculation passage. Further, conditions that may decrease a tendency for the compressor to surge (and consequently result in surge line adaptation beyond the advance limit) may include a leakage in the intake passage. Accordingly, the controller may set a diagnostic code to indicate intake system malfunction including one or more of CCRV throttle malfunction (more open than desired), leakage in the recirculation passage, and leakage in the intake passage.

At 418, upon confirming that the adapted surge line is within the advance limit, method 400 may include determining normal function of the CCRV throttle and recirculation passage.

Returning to 410, if it is confirmed that the adapted surge line is retarded, method 400 proceeds to 414. At 414, method 400 includes judging if the adapted surge line is to the right of the retard limit. In one example, it may be determined if an area to the left of the adapted surge line is greater than a threshold retard area. The threshold retard area may be based on an engine system configuration for a particular vehicle which may include but not limited to a compressor configuration and an intake system configuration, and may be further based on a maximum part-to-part variability and change over time for functioning system components. In some examples, the threshold retard area may be based on engine displacement and/or intake system volume directly related to engine displacement. If the answer at 414 is YES, the adapted surge line is outside the expected retard limit and accordingly, method 400 proceeds to 420. If the answer is NO, the adapted surge line is within the expected retard limit and accordingly, method 400 proceeds to 418.

At 420, method 400 may include determining that the CCRV throttle is more closed than desired or a block may be present in the recirculation passage (e.g. compressor recirculation passage 150 at FIG. 1). For example, a malfunctioning CCRV throttle that is more closed than desired (due to accumulation of sludge, for example) or a block in the compressor recirculation path may decrease flow through the compressor. Consequently, compressor outlet pressure and hence, compressor pressure ratio may increase. As a result, the compressor may surge when operating in the non-surge region and further, a number of compressor surges in the non-surge region may increase. Consequently, the surge line may continue to be adapted to the right. That is, the surge line may continue to be retarded beyond the retard limit. Therefore, upon judging that the surge line is adapted to the right of the retard limit, method 400 may determine that the CCRV throttle is stuck closed or method 400 may determine that a block is present in the recirculation passage restricting air flow. Further, conditions that may increase a tendency for the compressor to surge (and consequently result in surge line adaptation beyond the retard limit) may include a clogged compressor inlet, and a damaged compressor blade. Accordingly, the controller may set a diagnostic code to indicate intake system malfunction including one or more of CCRV throttle malfunction (more closed than desired), blockage in the recirculation passage, clogged compressor inlet, and damaged compressor blade.

At 418, as discussed above, upon confirming that the adapted surge line is within the retard limit, method 400 may include determining normal function of the CCRV throttle and recirculation passage.

In this way, by monitoring the adapted surge line, degradation (stuck open or stuck closed) of the CCRV throttle or faults in the compressor recirculation passage/intake passage may be determined.

In one example, method of FIG. 4 provides for a method for an engine, comprising: indicating degradation of a compressor recirculation valve based on a surge line adaptation of a surge line on a compressor map stored in a controller of the engine. The method includes wherein the surge line adaptation is learned over one or more drive cycles, and wherein learning the surge line adaptation includes learning a range of the surge line adaptations including a left surge line boundary and a right surge line boundary. Further, the method comprises indicating a compressor recirculation valve opening amount less than a desired amount based on the surge line adapted to a right side of the right surge line boundary, and indicating the compressor recirculation valve opening amount greater than the desired amount based on the surge line adapted to a left side of the left surge line boundary.

The method includes wherein the surge line adaptation is learned based on one or more of a compressor surge event, a number of surge events, a tip-out greater than a threshold amount and the compressor not surging during the tip-out, and a number of tip-outs, each tip-out greater than the threshold amount and the compressor not surging during each of the tip-outs, the surge detected based on a frequency of a throttle position sensor greater than a threshold frequency, the sensor located downstream of the compressor. Further, the method includes wherein the surge line is adapted to the left of an initial surge line in response to the number of tip-outs greater than a threshold number of tip-outs, and wherein the surge line is adapted to the right of an initial surge in response to the number of surge events greater than a threshold number of surge events.

In another example, the method of FIG. 4 provides a method for an engine, comprising: monitoring a global adaptation of a compressor surge line; in response to a first condition, indicating a compressor recirculation valve is more open than a desired opening amount; and in response a second condition, indicating the compressor recirculation valve is more closed than a desired closing amount; wherein the first condition includes determining that the adapted surge line is adapted beyond an advance limit; and wherein the second condition includes determining that the compressor surge line is adapted beyond a retard limit.

The method further includes wherein the global adaptation of the surge line includes retarding the surge line in response to a number of surge events greater than a threshold number of surge events, and advancing the surge line in response to a number of tip-out events greater than a threshold number of tip-out events, each of the number of surge events detected based on a frequency of throttle inlet pressure sensor signal greater than a threshold frequency, and each of the number of tip-out events greater than a threshold amount, and the compressor not surging during each of the number of tip-out events.

The method further includes wherein retarding the surge line includes adjusting the surge line to a left side of an initial surge line, and wherein advancing the surge line includes adjusting the surge line to a right side of the initial surge line.

Turning to FIG. 5, it shows a map 500 illustrating an example adaptation of a surge line. In particular, map 500 of FIG. 5 shows a change in compressor pressure ratio (along the y-axis) at different compressor flow rates (along the x-axis). Line 502 shows the surge line (or surge limit) for the given operating conditions. The pressure-flow coordinates to the left of the surge line 502 are in a surge region 506, where conditions are of low enough flow and high enough pressure to cause compressor surge. Compressor operation in surge region 506 results in objectionable NVH and potential degradation of engine performance. The pressure-flow coordinates to the right of the surge line 502 are in a non-surge region. Compressor operation in the non-surge region may not result in compressor surge.

The surge line may be adapted in real-time during one or more drive cycles to learn surge behavior of the compressor under most recent vehicle operating conditions. For example, surge line 502 may be retarded or advanced based on determination a compressor surge event or a compressor non-surge condition, and an operating point of the compressor on the map during the determination. As such, the compressor surge event may be determined based on a frequency of a throttle inlet pressure sensor signal greater than a threshold frequency. In one example, in response to detecting the surge and a number of surge events greater than a threshold number of surge events, surge line 502 may be retarded. Retarding surge line 502 may result in an example adapted surge line 510. In another example, in response to detecting a tip-out event greater than a threshold amount and not detecting a surge during the tip-out, and a number of such tip-out events greater than a threshold number of tip-out events, surge line 502 may be advanced. Advancing surge line 502 may result in an adapted surge line 508. In some examples, a retard gain by which the surge line is retarded or an advance gain by which the surge line is advanced may be a calibratable constant (e.g. +/−0.005 kilograms per second or +/−5 percent of the corrected mass flow rate. In some other examples, the retard gain or the advance gain may be based on a current stage in a life cycle of the vehicle. Further, in some examples, the retard gain may be based on an average intensity of the number of surge events. While the example illustrated herein shows global adaptation of the surge line wherein the entire surge line is advanced or retarded, it will be appreciated that one or more local adaptation may be performed prior to the global adaptation. For example, local adaptation of the surge line may include adapting a region of the surge line corresponding to an operating point of the compressor at which the surge or the tip-out was detected. For example, the region of the surge line may include two points on the surge line that are closest to the operating point of the compressor. In one example, upon locally adapting all the regions of the surge line, global adaptation may be performed by linking the locally adapted regions via linear interpolation.

In some examples, upon performing global advancing adjustments, the controller may wait for a calibratable number of surge events. Upon reaching the calibratable number of surge events, it may be inferred that the new globally adapted surge line results in compressor surge. Accordingly, retard adjustments may be made. Subsequent global adjustments may be performed only upon visiting all the regions of the surge line.

In some other examples, upon performing global retard adjustments, the controller may wait for a calibratable number of tip-out events (e.g. tip-out events that do not result in surge). Upon reaching the calibratable number of tip-out events, advancing adjustments may be performed. Subsequent advancing adjustments may be performed only upon visiting all the regions of the surge line.

Further, surge line adaptations may be monitored and the information may be utilized for FMEM actions. For example, if the surge line adaptation results in a surge line located beyond an expected range, it may be utilized to determine faults in a compressor recirculation valve or the compressor recirculation path. Specifically, if the surge line is advanced beyond an advance limit (e.g. to the left of the advance limit) and as a result increasing the non-surge region, it may be inferred that the compressor is not surging during expected surge conditions. Consequently, it may be determined that the recirculation valve may be more open that desired. For example, if the recirculation valve is stuck open, the valve may bleed off boosted air resulting in increased compressor flow. Consequently, a tendency for the compressor to surge during expected surge conditions (e.g. during large tip-outs) may decrease. Accordingly, the surge line may be adapted continuously to the left. Upon determining that the adapted surge line is adapted beyond the advancing limit, it may be inferred that the recirculation valve is stuck open. Additionally or alternatively, surge line adaptation beyond the advancing limit may indicate leaks in the recirculation path.

Likewise, if the surge line is retarded beyond a retard limit (e.g. to the right of the retard limit) and as a result increasing the surge region, it may be inferred that the compressor is surging more than expected. Consequently, it may be determined that the recirculation valve may be more closed that desired. For example, if the recirculation valve is stuck closed, a compressor outlet pressure may increase. Consequently, a tendency for the compressor to surge may increase. Accordingly, the surge line may be adapted continuously to the right. Upon determining that the adapted surge line is adapted beyond the retard limit, it may be inferred that the recirculation valve is stuck closed. Additionally or alternatively, surge line adaptation beyond the retard limit may indicate blocks in the recirculation path.

In this way, surge line may be adapted in real-time for more accurate calibration of the surge line. As a result, surge mitigation/avoidance actions may be performed more accurately. Further, by detecting defects in the compressor recirculation valve or the recirculation path based on the adapted surge line, appropriate remedial actions may be performed in a timely manner. Consequently, NVH issues may be reduced, and drivability and fuel economy may be improved.

Figure 6:
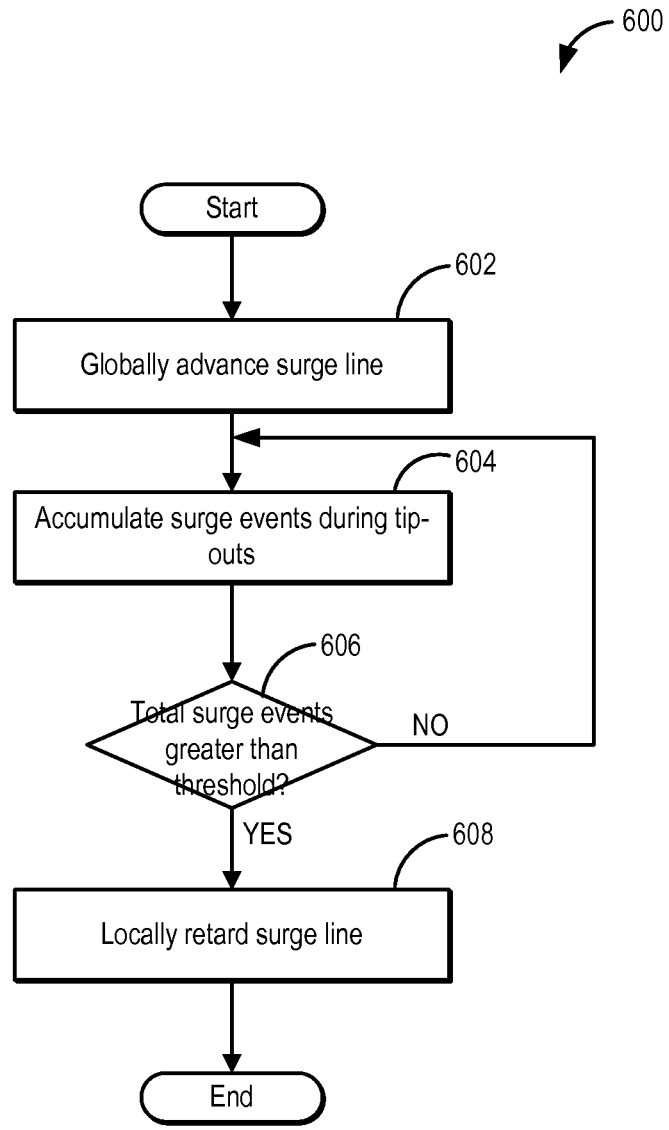
FIG. 6 shows a high level flow chart illustrating an example initial adjustment of the surge line.

Turning to FIG. 6, a method 600 for performing an initial surge line adjustment is shown. The initial adjustment may be performed on a factory calibrated surge line. The factory calibrated surge line may also be referred to as the manufacturer calibrated surge line and may be based on a worst of worst case scenario. As such, the initial adjustment may a first adjustment performed on the factory calibrated surge line. The method of FIG. 6 may be included in the system of FIG. 1 as executable instructions stored in non-transitory memory.

At 602, method 600 may include globally advancing the factory calibrated surge line. As such, the factory calibrated surge line may be calibrated by the manufacturer and may be calibrated conservatively based on a worst of worst case scenario. Therefore, the initial surge line adjustment may include globally advancing the factory calibrated surge line. For example, a delta adjustment may be performed on the factory calibrated surge line so as to globally advance the factory calibrated surge line. That is, the entire factory calibrated surge line may be advanced.

Upon globally advancing the surge line, method 600 may proceed to 604. At 604, method 600 may include accumulating surge events during tip-out conditions. Accumulating surge events during tip-outs may include determining if a surge event has occurred during tip-out conditions and storing the number of surge events occurred during tip-out conditions in the controller memory. Next, at 606, method 600 may include determining if the number of surge events during tip-out conditions is greater than a threshold number. If the number of surge events is greater than the threshold number, the answer is YES, and the method may proceed to 608. At 608, method 600 may include locally retarding the globally advanced surge line. That is a region of the globally advanced surge line may be retarded. Upon locally retarding the surge line, global retard adjustments may be performed. If the number of surge events is not greater than the threshold number, the answer is NO and the method may return to step 604.

While the above example illustrates waiting until the number of surge events is greater than a threshold before performing retard adjustments, in some examples, a surge intensity during tip-out conditions may be monitored. Upon the surge intensity exceeding a calibratable threshold intensity, local retard adjustments may be performed on the globally advanced surge line.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine including a compressor, comprising:
  detecting a surge event of the compressor based on a frequency content of a signal from a throttle inlet pressure sensor located downstream of the compressor; and
  adapting a surge line of a compressor map stored in a memory of a controller of the engine based on an operating point of the compressor during the surge event;
    wherein the operating point includes an estimated and/or a measured compressor pressure ratio and a corrected compressor flow during the surge event.

2. The method of claim 1, further comprising:
  in response to a tip-out greater than a threshold amount and not detecting a surge during the tip-out, advancing a region of the surge line, wherein advancing the region of the surge line includes adjusting the region of the surge line to left of the surge line on the compressor map as a function of the compressor pressure ratio and the compressor flow, the region of the surge line corresponding to a region on the compressor map, and the region on the map including a tip-out operating point corresponding to an estimated and/or a measured compressor pressure ratio and a corrected compressor flow at which the tip-out occurred; and
  advancing the region of the surge line by a first selected amount of advancement.

3. The method of claim 2, further comprising advancing the region of the surge line in response to a number of tip-outs greater than a threshold number and not detecting surge at each of the number of the tip-outs; and wherein said each of the number of the tip-outs is greater than the threshold number and occurring in the region on the compressor map.

4. The method of claim 3, further comprising advancing the region of the surge line to left of the surge line on the compressor map as a function of the compressor pressure ratio and the compressor flow in response to the region on the compressor map located to the left of the surge line.

5. The method of claim 2, wherein the first selected amount is based on an amount of tip-out.

6. The method of claim 1, further comprising retarding a region of the surge line corresponding to the compressor pressure ratio and corrected compressor flow at which surge occurred by a second selected amount of retard:
- wherein retarding the region of the surge line includes adjusting the region of the surge line to right of the surge line on the compressor map as a function of the compressor pressure ratio and the compressor flow; and
- wherein the second selected amount of retard is based on a surge intensity.

7. The method of claim 6, further comprising retarding the region of the surge line in response to a number of surge events greater than a threshold number of surge events; and wherein each of the number of the surge events occurs at a region on the compressor map corresponding to the region on the surge line.

8. The method of claim 7, further comprising retarding the region of the surge line in response to the region on the compressor map located to the right of the surge line on the compressor map.

9. The method of claim 1, further comprising:
- globally advancing the entire surge line in response to detecting a number of tip-outs greater than a threshold number and not detecting the surge event during each of the number of tip-outs, each tip-out greater than a threshold amount;
- wherein globally advancing the entire surge line includes adjusting all regions of the surge line to left of the surge line on the compressor map as a function of the compressor pressure ratio and the compressor flow.

10. The method of claim 1, further comprising, globally retarding the entire surge line in response to detecting a number of surge events greater than a threshold number; wherein globally retarding the entire surge line includes adjusting the entire surge line to the right of the surge line on the compressor map as a function of the compressor pressure ratio and the compressor flow.

11. A method for operating a turbocharged engine including a compressor, comprising:
- in response to a request to learn a compressor surge line,
  - during a first condition,
    - determining an advancing gain; and
    - adjusting the surge line by locally advancing at least a first region on a surge line of a compressor map based on the advancing gain, the compressor map stored in a memory of an engine controller; and
  - during a second condition,
    - determining a retarding gain; and
    - adjusting the surge line by locally retarding at least a second region on the surge line based on the retarding gain;
    - wherein locally advancing the first region includes adjusting the first region to left of the surge line on the compressor map as a function of compressor pressure ratio and compressor flow; and
    - wherein locally retarding the second region includes adjusting the second region to the right of the surge line on the compressor map as a function of the compressor pressure ratio and the compressor flow.

12. The method of claim 11,
wherein the first condition includes a tip-out amount greater than a threshold amount and the compressor not surging during the tip-out, the tip-out based on a change in pedal position indicated from a pedal position sensor; and
wherein the tip-out occurs at a tip-out compressor operating point on the compressor map, the tip-out compressor operating point located to a left side of the surge line on the compressor map, and wherein the tip-out compressor operating point on the map is located closer to the first region including a first point and a second point on the surge line than remaining points on the surge line.

13. The method of claim 11,
wherein the second condition includes detecting a compressor surge event based on a frequency of a signal from a throttle inlet pressure sensor located downstream of an outlet of the compressor; and
wherein the compressor surge event occurs at a compressor operating point on the compressor map, the compressor operating point located to a right side of the surge line on the compressor map, and
wherein the compressor operating point on the map is located closer to the second region including a third point and a fourth point on the surge line than remaining points on the surge line.

14. The method of claim 13, further comprising:
during the first condition, globally advancing the entire surge line on the compressor map as a function of the compressor pressure ratio and the compressor flow in response to a number of tip-outs greater than a first threshold number, the entire surge line including all regions of the surge line; and
during the second condition, globally retarding the entire surge line on the compressor map as a function of the compressor pressure ratio and the compressor flow in response to a number of surge events greater than a second threshold number, the surge events based on the frequency of the signal from the throttle inlet pressure sensor; and
wherein at the number of the tip-outs, a tip-out amount is greater than a threshold amount, the signal from the throttle inlet pressure sensor indicates that the compressor is not surging, and the number of the tip-outs occurs in a region located to the left of the surge line on the compressor map.

15. The method of claim 11, wherein the retarding gain is greater than the advancing gain.

16. The method of claim 11,
wherein the advancing gain is based on an amount of tip-out based on a change in pedal position indicated by a pedal position sensor, and the retarding gain is based on a surge intensity based on a signal from a throttle inlet pressure sensor; and
wherein the first region is separate from the second region.

17. The method of claim 16, further comprising not retarding the advanced first region until all regions on the surge line are adjusted; and further comprising not advancing the retarded second region until all the regions on the surge line are adjusted.

18. A turbocharger system of an internal combustion engine, comprising:
a compressor;
a throttle inlet pressure sensor located downstream of an outlet of the compressor and upstream of an intake throttle; and
a controller with computer readable instructions stored in non-transitory memory, and further including a compressor map stored in the memory for:
in response to a request to learn a compressor surge line adaptation, detecting a compressor surge event based on an amplitude of the pressure sensor greater than a threshold amplitude and the amplitude within a threshold frequency range of the pressure sensor;

determining a number of compressor surge events in a first compressor map region including a surge operating point on the compressor map at which the surge event is detected; and in response to the number of the surge events in the first map region greater than a threshold number, retarding a first surge line region located on a surge line of the compressor map, the first surge line region corresponding to the surge operating point;

wherein, retarding the first surge line region includes adjusting the first surge line region to the right of the surge line on the compressor map as a function of compressor pressure ratio and compressor flow.

19. The system of claim 18, wherein the controller includes further instructions for, in response to the request to learn the surge line adaptation, detecting an absence of the compressor surge event during a tip-out greater than a threshold;

determining a number of tip-out events in a second compressor map region including a tip-out operating point on the compressor map at which the tip-out is detected; and in response to the number of tip-out events in the second compressor map region greater than a threshold number of tip-outs, advancing a second surge line region located on the surge line, the second surge line region corresponding to the tip-out operating point; and wherein advancing the second surge line region includes adjusting the second surge line region to the left of the surge line on the compressor map as a function of the compressor pressure ratio and the compressor flow.

20. The system of claim 19, wherein the controller includes further instructions for, linking the first surge line region and the second surge line region via linear interpolation to obtain a final surge line; and wherein the first surge line region is adjacent to the second surge line region.

* * * * *